United States Patent [19]

Miller

[11] 4,044,725
[45] Aug. 30, 1977

[54] PET COLLAR

[76] Inventor: Howard I. Miller, Unit 35, Sixty-01 Apt.'s, Redmond, Wash. 98052

[21] Appl. No.: 543,804

[22] Filed: Jan. 24, 1975

[51] Int. Cl.$^2$ .......................................... A01K 27/00
[52] U.S. Cl. ............................... 119/106; 24/211 R; 63/DIG. 3; 403/122
[58] Field of Search ............... 119/106, 156; 403/122, 403/123, 131, 90; 24/211 R, 213 CS; 63/2, 3, 11, DIG. 3; 85/84; 424/DIG. 10, 14, 28

[56] References Cited

U.S. PATENT DOCUMENTS

| | | | |
|---|---|---|---|
| 1,210,337 | 12/1916 | McIntyre | 24/211 R |
| 2,322,461 | 6/1943 | Mariano | 63/3 |
| 2,714,269 | 8/1955 | Charles | 63/DIG. 3 |
| 2,921,819 | 1/1960 | Rifkin | 24/211 R |
| 2,944,313 | 7/1960 | Reiland | 24/211 R |
| 3,754,285 | 8/1973 | Greene | 63/DIG. 3 |
| 3,852,416 | 12/1974 | Grubb et al. | 119/106 |

Primary Examiner—Jay N. Eskovitz
Attorney, Agent, or Firm—Christensen, O'Connor, Garrison & Havelka

[57] ABSTRACT

A plurality of resiliently yieldable, molded plastic links, each having complimentary ball and socket portions at opposed longitudinal ends, are snap-locked together to form a closed loop pet collar. One of the interlocked links is adjustable to release when subjected to a threshold collar tension, to protect the pet should the collar catch on some obstruction. For this purpose, the adjustable link includes an adjusting screw threadedly disposed in a longitudinal bore of the link and accessible for screwdriver adjustment through the socket portion thereof, and having an end extending centrally and longitudinally into the ball portion of the link. The ball portion of the link is slotted to modify the compressibility thereof and the internally mounted screw is longitudinally positionable to vary the ball portion compressibility and thus the threshold force required to release this link from the socket portion of an adjoining link. Alternatively, the adjustable link may be formed in two parts, with an integrally molded longitudinally aligned screw portion on a socket part which is threadedly insertable into an opening in a separate slotted ball portion part. The screw portion both secures the separate ball and socket parts together and adjusts the compressibility of the ball portion. In another embodiment, one or more of the interconnected or interlocked links is specially treated with an insecticide or flea repellent chemical, wherein the treated links may be replaced after dissipation of the chemical. Still another version of the collar provides for the molding of the individual links as alpha-numerical characters, each being structurally integral with the ball and socket portions, so that a plurality of different alphabet and number characters may be selectively linked together to identify the pet.

15 Claims, 8 Drawing Figures

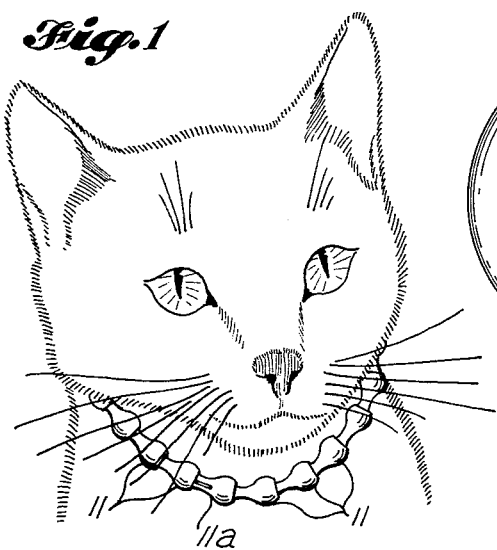
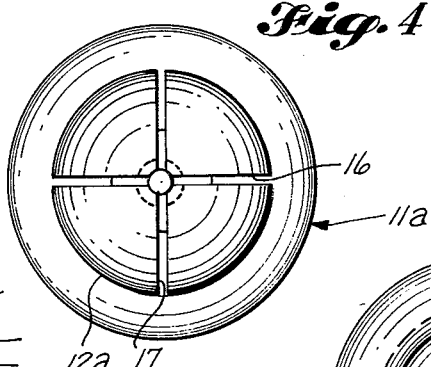
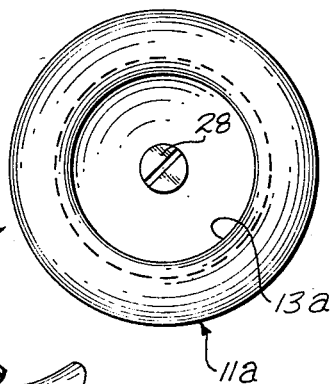
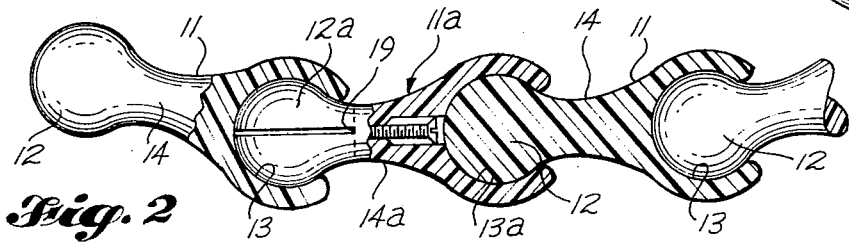
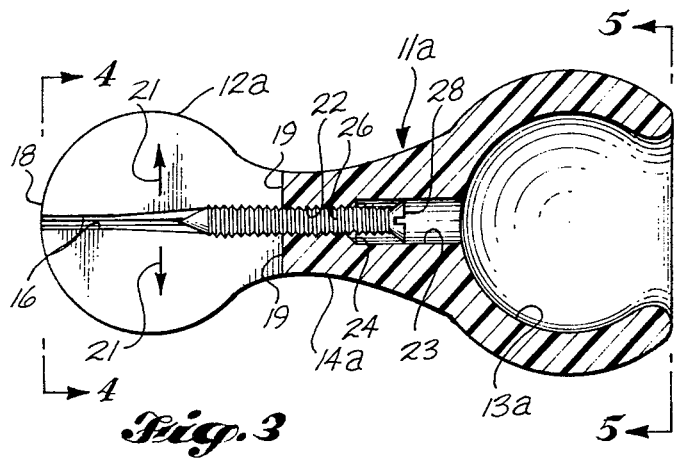
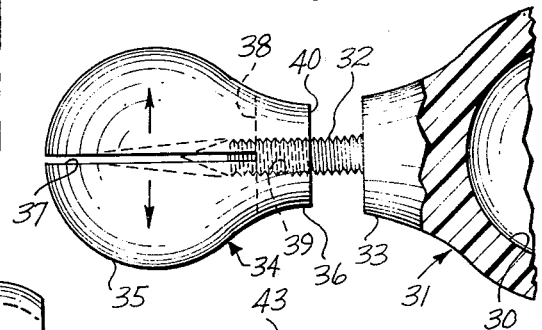
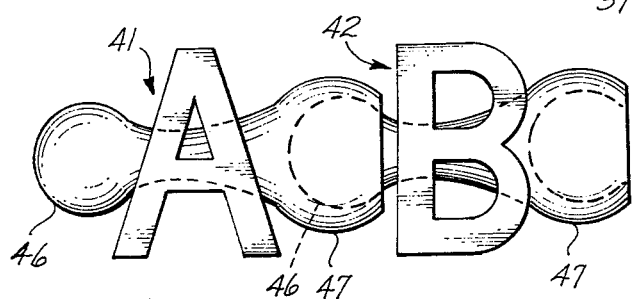
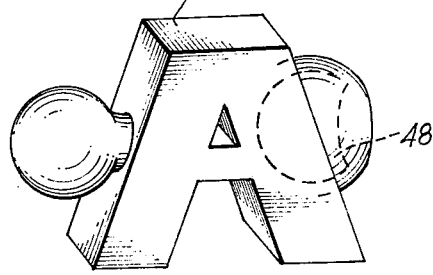

PET COLLAR

BACKGROUND OF THE INVENTION

In general, the present invention relates to pet collars, and more particularly to pet collars of the type capable of releasing under tension, to protect the pet in the event the collar becomes entangled with some obstruction.

Although releasable or break-away pet collars are in general known, none have been found to provide the reliability necessary to insure the safety of the pet when the collar is caught on some obstacle such as shrubbery, fencing, etc. Reliability necessitates a positive release of the collar under a predetermined amount of maximum tension, wherein the particular threshold of the break-away tension will vary from pet to pet. Thus, it would be desirable to provide a lower threshold of break-away force for a cat, as compared with most dogs. A similar variation in release level would be desirable for different size animals of the same type.

The minimum threshold amount of collar tension resulting in release will usually be determined by the associated inconvenience of frequent loss of collars which release too easily. Additionally, in those cases where the collar is used in conjunction with a leash, it is of course desirable to provide a sufficiently high minimum threshold of release, adequate for maintaining the animal under control while held by a leash.

In addition to the desired reliability of the releasing mechanism, it is equally important that the collar be capable of being manufactured at a sufficiently low cost so that the item can be made available to pet owners at a reasonable price.

SUMMARY OF THE INVENTION

It is with these objectives in mind, that the present invention provides in general a pet collar constructed of a plurality of interconnected, resiliently yieldable, plastic links formed of complimentary, interlocking ball and socket portions, with at least one of the interconnected links being adjustable to release under a predetermined maximum separating force or tension, adjustable for each individual pet. Briefly, the variable release tension is provided by an adjusting screw either integrally molded as an extension of the socket portion or as a separate screw accessible through the socket portion of the adjustable link, with the screw having a forward end portion which extends into and selectively varies the compressibility or yieldability of a slotted ball or head portion of the same link, thereby setting the amount of force required to release this link from the socket of the adjacent link. By constructing the remaining links with ball and socket portions having a threshold releasing force which is greater than the maximum tension sustainable by the adjustable link, the adjustable link becomes the weakest link and thus it determines the threshold releasing force for the pet. Also, since the links are each separable from the remaining links of the collar, the size of the collar may be easily adjusted to fit the individual pet by merely increasing or decreasing the number of regular links.

In one embodiment of the pet collar, one or more of the individual links are treated as disclosed herein with a flea repellent or insecticide to serve as a flea collar. In another embodiment, the individual links are formed in the shape of alpha-numeric characters, arranged in the collar to form the pet's name, address, etc., for identification purposes.

These and further objects and various advantages of the pet collar in accordance with the preferred embodiments of the present invention will become apparent to those skilled in the art from a consideration of the following detailed description and appended drawings.

BRIEF DESCRIPTION OF THE DRAWINGS

FIG. 1 is a view of the collar constructed in accordance with a preferred embodiment of the invention, as worn by a pet.

FIG. 2 is a detail view, partly in axial cross section, illustrating a chain of interconnected links including the adjustable releasing link.

FIG. 3 is an enlarged axial, sectional view of the adjustable link shown in FIGS. 1 and 2.

FIG. 4 is an end elevational view of the slotted head or ball portion of the adjustable link as viewed from arrows 4—4 of FIG. 3.

FIG. 5 is an end elevational view of the socket portion of the adjustable link as seen from arrows 5—5 of FIG. 3.

FIG. 6 illustrates an alternative embodiment of the adjustable releasing link of the invention in which the adjustable link is formed in two parts with a first part including the socket portion and having an integrally molded screw portion threadedly insertable into an opening provided for the purpose in the base of a slotted ball portion part.

FIGS. 7 and 8 are perspective views of alternative embodiments of the individual links of the pet collar shown in FIG. 1, wherein each link is integrally molded as an alpha-numeric character.

DESCRIPTION OF THE PREFERRED EMBODIMENTS

With reference to FIGS. 1 and 2, the releasable pet collar of the present invention is constructed of a plurality of interconnected links 11 molded from a resilient plastic material such as polyethylene or other moldable material having similar properties. In general, each link 11 is elongate and is formed with complimentary, longitudinally aligned ball or semispherical head and socket portions 12 and 13 respectively. The plastic material from which the links are made and the relative dimensions of the head and socket portions is such as to cause each of the various socket portions 13 to be resiliently yieldable so as to receive in a snap-locking fit, the complimentary ball-shaped or semispherical head portions 12 of an adjacent link. A central neck portion 14 is provided on each link, structurally and integrally connecting the associated head and socket portions along the longitudinal axis of the link.

To provide the adjustable, releasing force or tension threshold of the collar, at least one of the interconnected links 11 is constructed with an internal screw adjustment means for setting the amount of force or tension required to release this link from the associated or adjacent collar link. The adjustable link 11a is shown in FIGS. 2 through 5 to include a plurality of slots, more fully described herein, disposed in its head portion 12a to provide a means for rendering the outermost, transverse circumference of head portion 12a more yieldable or compressible during its entry and withdrawal from the cooperating socket portion. Cooperating with these slots, a screw is mounted internally of the link and is adjustable in longitudinal position to vary the compressibility of head portion 12a, and thus vary the level of force or tension required to separate this head portion from its locked position within socket 13a of the connecting link. By this means, the link may be adjusted and set to a desired threshold release level.

In this instance, head portion 12a of the adjustable link 11a is provided with at least one, and in this instance two, laterally and longitudinally extending slots 16 and 17, oriented substantially 90° apart when viewed along the longitudinal axis of the link as illustrated in FIG. 4. These slots 16 and 17 are substantially longitudinally coextensive with the longitudinal extent of head portion 12a, commencing at an axial end 18 and terminating at a point 19 adjacent the junction of head portion 12a and neck portion 14a. In the lateral dimension, slots 16 and 17 extend from the central axis of the link to the outer circumference of head portion 12a as best illustrated in FIG. 3. These slots divide the head portion 12a into four quadrants or segments which may be stiffened, or even splayed outwardly, in opposition to radially inwardly directed compression forces, as indicated by arrows 21, in response to the longitudinal position of an axially disposed adjusting screw in order to set the locking force of head portion 12a within a mating socket portion 13a.

To achieve this adjustment, an axial bore 22 is provided through neck portion 14a, with a counter bore 23 extending from a centermost recess of socket portion 13a to a point 24 of termination approximately midway through neck portion 14a. Adjacent head portion 12a, axial bore 22 communicates or opens into the axial intercept of slots 16 and 17 so as to accommodate an end of an elongate adjusting screw 26. Screw 26 is thus axially, threadedly received within bore 22 by molded or machined threads in the bore, or more preferably by self threading of the screw itself. The length of screw 26 is selected such that a tapered end portion 27 may be inserted to a position generally aligned with the maximum, outer transverse diameter or circumference of the head portion 12a to achieve a maximum locking and releasing force for the adjustable link. Conversely, counterbore 23 should be sufficient in longitudinal dimensions to permit retraction of end 27 of screw 26 to a point generally aligned with the termination point 19 of slots 16 and 17, while still maintaining screw head 28 of the screw recessed within the counterbore so as not to interfere with the cooperation of socket portion 13a with the adjoining link head portion. Alternatively, a headless adjusting screw may be employed having an end adjacent the socket portion formed to receive a torque driver, such as a driver blade, Phillips driver, Allen driver, etc. In such case, counterbore 23 may be omitted.

As illustrated in FIG. 5, the screw head 28 is accessible through the opening of socket portion 13a for receiving a driving blade of a screwdriver to set the desired release threshold. After adjustable link 11a has been connected into a collar as shown in FIG. 1, it may be subsequently adjusted as desired by pulling on the collar to cause head portion 12a to release from the socket portion of the adjacent link. Then, by grasping that link having its head portion 12 connected in socket portion 12a of the adjustable link, the adjustable link may be pulled away and isolated from the remaining collar links to expose socket portion 13a for adjusting screw head 28.

With screw 26 adjusted for a minimum releasing tension, that is with the screw end 27 substantially withdrawn from head portion 12a, slots 16 and 17 will permit slight contraction or compression of head portion 12a to ease its withdrawal from socket portion 13. It will be noted that with screw 26 in this position of minimum releasing tension, adjustable link 11a is the weakest link of the collar. The remaining interlocked links, being formed with solid, unitary head portions 12, do not afford the compressibility or contraction provided by slotted head portion 12a, and thus are more firmly locked within the cooperating socket portions 13 and 13a. From this level of minimum separating force, screw 26 may be adjusted into head portion 12a to achieve varying degrees of threshold separating force on up to a force substantially equal to the separating force of the nonadjustable links.

In another aspect of this invention, one or more of links 11 may be treated with a chemical, such as an insecticide or insect repellent, or animal repellent worn by pets in heat to rebuff males of the species, by impregnating, coating or otherwise treating the plastic material of the links. For example, several circumferentially disposed links on the pet collar may be treated with a flea repellent to form a releasable, adjustable flea collar for dogs or cats. As the potency of the treated links dissipates, these special links may be replaced with fresh ones while still retaining the major portion of the original collar. Also, a varied number of such treated links may be employed to vary the potency or dosage for each individual pet.

With reference to FIG. 6, another embodiment of the adjustable link in accordance with the present invention is illustrated in which a two-part construction is provided with a socket portion part 31 having a socket portion 30 and an integrally molded longitudinally aligned threaded screw portion 32 extending rearwardly of the socket portion from a transversely truncated neck portion 33 of part 31. The other part 34 carries the slotted head portion 35 and is similar to portion 12a except that it is severed from the socket portion at truncated neck portion 36 at a longitudinal location spaced apart from slots 37 and 38 such that neck portion 36 serves as a base from which the segments of the head portion formed by slots 37 and 38 extend. A centrally located longitudinally aligned bore 39 extends into a transverse face 40 defined by neck portion 36 and communicates with the intersection of slots 37 and 38 for cooperatively threadedly receiving screw portion 32 to vary the compressibility of head portion 35 in a manner similar to the functioning of screw 26 above. Adjustability is accomplished by affecting relative rotation between parts 31 and 34 to longitudinally advance or retract screw portion 32 within head portion bore 39.

In still another embodiment of the present invention, a number of special links may be molded or embossed in the shape of alpha-numeric characters or other indicia as shown in FIGS. 7 and 8. Each separate link, such as links 41 and 42 of FIG. 7 and link 43 of FIG. 8 has an alpha-numeric body structurally integrated with the head and socket portions of a standard or regular link. By selectively interconnecting a number of such specially formed links, the pet's name, address or other identity may be displayed, while at the same time providing portions of the collar structure.

As illustrated in FIGS. 7 and 8, and with particular reference to links 41 and 42 of FIG. 7, each such link is formed with complimentary semispherical or ball-shaped head and socket portions 46 and 47, which are structurally integrally molded with the alpha-numeric characters, in this instance being of three dimensional, block configuration, and wherein the link portions 46 and 47 here extend laterally outwardly on opposite sides of each of the block letters for snap-lock connection with a laterally extending complimentary element of an adjacent alpha-numeric character. It will be appreciated that the connecting portions 46 and 47 may extend from the top or bottom of the letters as desired, but preferably will be in alignment and within or parallel to the plane defined by the face of the character to permit the characters to be read once the collar has been installed on the pet. With reference to FIG. 8, a link 43 is provided in which the socket portion 48 is substantially recessed within the body proper of the alpha-numeric character. By suitably dimensioning and structurally designing the alpha-numeric characters, each character provides at least part of the structural body for the link, in lieu of neck portion 14 as shown in the embodiment of FIGS. 1 through 5.

Additionally, the alpha-numeric characters or other indicia means may be advantageously combined with the chemically treated links or links to afford quick, easy identification of the latter. In such case, the size and surface area of the link in the form of indicia means may be selected to provide a desired amount of chemical dosage or potency, where larger bodied links absorb a greater chemical dosage.

While only a limited number of embodiments of the present invention have been disclosed herein, it will be readily apparent to persons skilled in the art that numerous changes and modifications may be made thereto without departing from the spirit of the invention. Accordingly, the foregoing disclosure and description thereof are for illustrative purposes only and do not in any way limit the invention which is defined only by the following claims.

What is claimed is:

1. A releasable pet collar including a plurality of interconnected, elongate, snap-locking links, each having longitudinally aligned, complementary resiliently yieldable, head and socket portions, comprising:
    at least one of said links being an adjustable releasing link wherein its head portion has slot means affording relative compressibility of the outer circumference of said head portion; and
    adjustable screw means carried by such link and being engagable with said slot means for adjustably varying said compressibility of said outer circumference of said head portion, whereby said head portion of said link is held within a cooperating socket portion of an adjoining link by a threshold release force that may be adjusted by said screw means for each individual pet.

2. The releasable pet collar as defined in claim 1, wherein said slot means comprises a plurality of longitudinally and laterally extending slots formed in said head portion and intersecting the longitudinal axis of said link, and said adjustable screw means includes a screw member disposed in a threaded axial bore extending between said socket portion of said link and said slots.

3. The releasable pet collar as set forth in claim 1, wherein said slot means comprises at least one slot extending laterally in the plane of said longitudinal axis of said link and longitudinally between an axial end of said head portion remote from said socket portion to a point of termination intermediate said head and socket portions, and said adjustable screw means comprises an elongate screw member disposed in an axial bore extending between said socket portion and said slot for longitudinal adjustment coaxially with said longitudinal axis of said link.

4. The releasable pet collar as defined in claim 1, wherein said slot means comprises a plurality of longitudinally and laterally extending slots intersecting said longitudinal axis of said link and dividing said head portion into a plurality of radially and inwardly compressible segments, and wherein said adjustable screw means is disposed coaxially within said link between said socket portion and said plurality of slots for adjustable stiffening of said head portion segments against radially inward compression forces.

5. The releasable pet collar as set forth in claim 1, wherein said adjustable screw means comprises an internal axial bore extending from a recessed central point of said socket portion to said slot means and including an elongate axially aligned screw member cooperatively threaded in said bore, said screw member having a drive head accessible for receiving a cooperating driver through the opening in said socket portion.

6. A releasable pet collar as set forth in claim 1, further comprising:
    at least one of said links being treated with a chemical for controlling insects, whereby the treated link may be replaced in the collar after the effectiveness of said chemical has dissipated.

7. The pet collar as set forth in claim 6, wherein said chemical is a flea repellent, whereby said collar may serve as a renewable flea collar for pets.

8. A pet collar as defined in claim 1, further comprising:
    at least one of said links being formed in the configuration of indicia means structurally integral with said head and socket portions, whereby the collar may be used to identify the pet.

9. A pet collar as set forth in claim 1, further comprising:
    a plurality of said interconnected links having structure defining an alpha-numeric character and being integral with said head and socket portions, whereby a number of such links representing alpha-numeric characters may be arranged and interconnected to form an identification collar for the pet.

10. The releasable pet collar of claim 1 wherein:
    said releasing link comprises a first part including said head portion and said slot means therein and a second part detachably connected to said first part and including said socket portion; said second part having an elongate screw portion integrally formed with said socket portion and extending rearwardly therefrom; and said first part having a threaded bore extending into said head portion and communicating with said slot means for detachably, threadedly receiving said screw portion of said second part for both securing said parts of said releasing link together and adjustably varying said compressibility of said head portion by selective longitudinal positioning of said screw portion in said head portion bore.

11. The releasable pet collar of claim 1 wherein:
    said first and second parts are integrally molded from a resiliently yieldable plastic material.

12. The releasable pet collar of claim 10 wherein:
    said second part has a transversely truncated neck portion adjacent the rear of said socket portion, said screw portion extending rearwardly from said truncated neck portion, and said first part head portion having a transversely truncated neck portion into which said threaded bore extends.

13. An adjustable releasable link for a pet collar having a plurality of interconnected, elongate, snap-locking links, each with longitudinally aligned, complementary, resiliently yieldable head and socket portions, comprising:

said releasable link having a head portion of resiliently yieldable material adjacent one end, said head portion having slot means affording relative compressibility of the outer circumference thereof;

said releasable link further having a complementary socket portion of resiliently yieldable material adjacent its opposite end; and adjustable screw means carried by said releasable link and being engagable with said slot means for adjustably varying said compressibility of said outer circumference of said head portion whereby said head portion of said adjustable releasable link may be held within a cooperating socket portion of an adjoining collar by a threshold release force that is adjusted by said screw means for each individual pet.

14. The adjustable releasable link as defined in claim 13, wherein said slot means comprises a plurality of longitudinally and laterally extending slots formed in said head portion and intersecting a longitudinal axis of said releasable link, a longitudinally aligned neck portion connecting said head and socket portions, and said adjustable screw means includes a screw member disposed in a threaded axial bore in said neck portion extending between said socket portion of said body and said slots.

15. The adjustable releasable link of claim 13, wherein said link comprises: a first part including a head portion having slot means and a second part detachably connected to said first part and including said socket portion; said second part having an elongated screw portion integrally formed with said socket portion and extending rearwardly therefrom; and said first part having a threaded bore extending into said head portion and communicating with said slot means for detachably threadedly receiving said screw portion of said second part at varying longitudinal positions therein for both securing said parts together and adjustably varying said compressibility of said head portion.

* * * * *